(12) United States Patent
Wang et al.

(10) Patent No.: US 11,374,704 B2
(45) Date of Patent: Jun. 28, 2022

(54) MAPPING BIT POSITIONS USING PREDICTED ERROR VALUES

(71) Applicant: Cisco Technology, Inc., San Jose, CA (US)

(72) Inventors: Huaiyi Wang, North Royalton, OH (US); Brian D. Hart, Sunnyvale, CA (US); Matthew A. Silverman, Shaker Heights, OH (US); Zhigang Gao, Twinsburg, OH (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 16/869,311

(22) Filed: May 7, 2020

(65) Prior Publication Data

US 2021/0351879 A1 Nov. 11, 2021

(51) Int. Cl.
*H04L 1/20* (2006.01)
*H04L 1/00* (2006.01)
*G16Y 40/10* (2020.01)

(52) U.S. Cl.
CPC ............ *H04L 1/206* (2013.01); *H04L 1/0003* (2013.01); *H04L 1/0009* (2013.01); *H04L 1/203* (2013.01); *G16Y 40/10* (2020.01)

(58) Field of Classification Search
CPC ..... H04L 1/206; H04L 1/0009; H04L 1/0003; H04L 1/203; G16Y 40/10
See application file for complete search history.

(56) References Cited

U.S. PATENT DOCUMENTS

| 10,277,252 | B2 | 4/2019 | Nammi et al. | |
|---|---|---|---|---|
| 2007/0086539 | A1 | 4/2007 | Hocevar | |
| 2013/0107989 | A1* | 5/2013 | Ancora | H04B 1/06 375/320 |
| 2015/0091742 | A1* | 4/2015 | Ionita | H03M 13/251 341/57 |
| 2017/0214416 | A1* | 7/2017 | Ge | H03M 13/13 |
| 2019/0215011 | A1 | 7/2019 | Nammi et al. | |
| 2019/0229752 | A1 | 7/2019 | Saber et al. | |

(Continued)

FOREIGN PATENT DOCUMENTS

| WO | 2017197358 A1 | 11/2017 |
|---|---|---|
| WO | 2018228601 A1 | 12/2018 |

OTHER PUBLICATIONS

PCT Notifiation of Transmittal of the International Search Report and the Written Opinion of the International Searching Authority, or the Declaration for Application No. PCT/US2021/070516 dated Aug. 5, 2021.

(Continued)

*Primary Examiner* — Oussama Roudani
(74) *Attorney, Agent, or Firm* — Patterson + Sheridan, LLP (57) ABSTRACT

Aspects described herein include a method comprising predicting, based on one or more transmission characteristics, error values for a sequence of bit positions used for modulating data within a packet. The method further comprises generating a bitmap that maps one or more payload bits and one or more padding bits of the packet to respective bit positions of the sequence. The one or more padding bits are preferentially mapped to respective bit positions having relatively greater error values. The method further comprises modulating the sequence according to the bitmap.

14 Claims, 7 Drawing Sheets

(56) References Cited

U.S. PATENT DOCUMENTS

| | | |
|---|---|---|
| 2019/0372605 A1 | 12/2019 | Li et al. |
| 2020/0112388 A1 | 4/2020 | Motozuka et al. |
| 2020/0195376 A1* | 6/2020 | Zhang .................. H04L 1/1812 |
| 2020/0287654 A1* | 9/2020 | Xi ........................... H04L 1/203 |
| 2021/0067269 A1* | 3/2021 | Chen ..................... H04L 1/0057 |
| 2021/0119735 A1* | 4/2021 | Xu ........................ H04L 1/0069 |

OTHER PUBLICATIONS

Li Zhenjiang Lzjang@ntu Edu SG et al., "Recitation Rehearsing Wireless Packet Reception in Software," User Interface Software and Technology ACM, 2 Penn Plaza, Suite 701 New York NY 10121-0701, USA, Sep. 7, 2015 (Sep. 7, 2015), pp. 291-303.
Zhenjiang Li, Yaxiong Xie, Mo Li and Kyle Jamieson, "Recitation: Rehearsing Wireless Packet Reception in Software," MobiCom'15, Sep. 7-11, 2015.
Erdal Arikan, "Channel Polarization: A method for constructing capacity-achieving codes for symmetric binary-input memoryless channels," Jul. 20, 2009, https://arxiv.org/pdf/0807.3917.pdf.

\* cited by examiner

MAPPING BIT POSITIONS USING PREDICTED ERROR VALUES

TECHNICAL FIELD

Embodiments presented in this disclosure generally relate to digital communications, and more specifically, to mapping bit positions for modulation using predicted error values.

BACKGROUND

The Internet-of-Things (IoT) has increased the proliferation of wirelessly-networked devices. To support low power consumption, the wirelessly-networked devices typically communicate with a uniform, small packet size (e.g., between about 15 bits and 4000 bits) and a low packet arrival rate. However, the packets may be communicated using physical layer (PHY) protocols that are not optimized for one or more of these transmission characteristics. For example, the IEEE 802.11 PHY is not optimized for IoT traffic, requiring IoT packets to be transmitted with a large number of padding bits, which consumes a significant portion of system energy and bandwidth.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method comprising predicting, based on one or more transmission characteristics, error values for a sequence of bit positions used for modulating data within a packet. The method further comprises generating a bitmap that maps one or more payload bits and one or more padding bits of the packet to respective bit positions of the sequence. The one or more padding bits are preferentially mapped to respective bit positions having relatively greater error values. The method further comprises modulating the sequence according to the bitmap.

Another embodiment is a network device comprising one or more computer processors configured to determine one or more transmission characteristics, and predict, based on the one or more transmission characteristics, error values for a sequence of bit positions used for modulating data within a packet. The one or more computer processors are further configured to generate a bitmap that maps one or more payload bits and one or more padding bits of the packet to respective bit positions of the sequence. The one or more padding bits are preferentially mapped to respective bit positions having relatively greater error values. The one or more computer processors are further configured to modulate the sequence according to the bitmap.

Another embodiment is a computer program product comprising a computer-readable storage medium having computer-readable program code embodied therewith. The computer-readable program code is executable by one or more computer processors to perform an operation comprising predicting, based on one or more transmission characteristics, error values for a sequence of bit positions used for modulating data within a packet. The operation further comprises generating a bitmap that maps one or more payload bits and one or more padding bits of the packet to respective bit positions of the sequence. The one or more padding bits are preferentially mapped to respective bit positions having relatively greater error values. The operation further comprises modulating the sequence according to the bitmap.

Example Embodiments

Within the 802.11 PHY, the padding bits are used solely to pad the input bit stream to properly align the boundaries of orthogonal frequency-division multiplexing (OFDM) symbols. Thus, the energy and bandwidth consumed when transmitting the padding bits do not contribute to the system throughput and transmission reliability, and are considered wasted from a system efficiency perspective. Bit errors may still occur for an IoT implementation with low client transmit power in a rich scattering environment. Further, different bit positions of a modulation constellation tend to be more or less reliable, as certain bit positions may have a larger Hamming distance between their '0' constellation points and '1' constellation points.

Embodiments described herein include a method comprising predicting, based on one or more transmission characteristics, error values for a sequence of bit positions used for modulating data within a packet. The method further comprises generating a bitmap that maps one or more payload bits and one or more padding bits of the packet to respective bit positions of the sequence. The one or more padding bits are preferentially mapped to respective bit positions having relatively greater error values. The method further comprises modulating the sequence according to the bitmap. Beneficially, by preferentially mapping the padding bits of packets to bit positions based on greater predicted error values, system throughput and transmission reliability may be increased.

Figure 1:
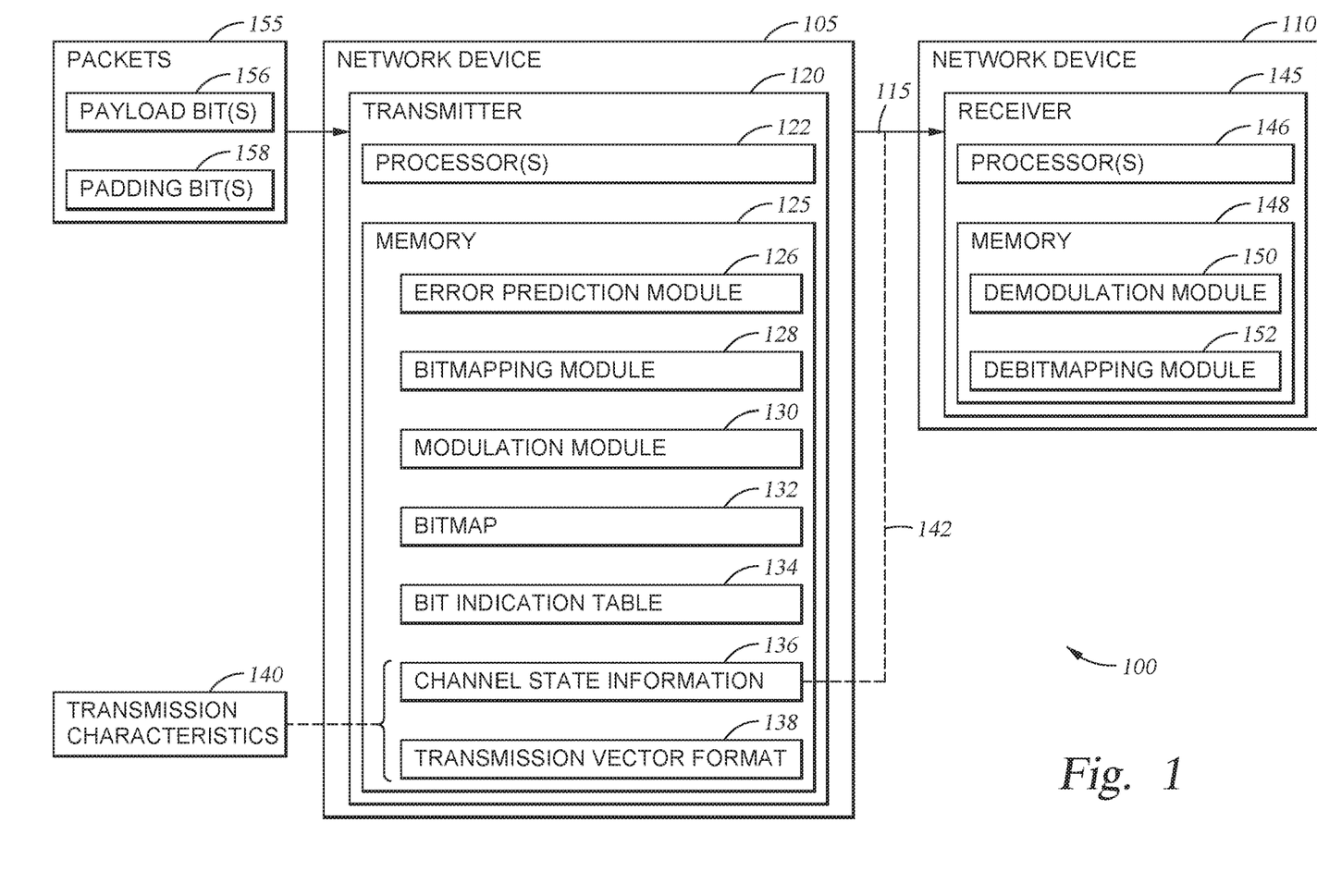
FIG. 1 illustrates an exemplary system with exemplary network devices, according to one or more embodiments.

FIG. 1 illustrates an exemplary system 100 with exemplary network devices, according to one or more embodiments. The system 100 comprises a network device 105 communicatively coupled with a network device 110 via a communicative link 115. The network devices 105, 110 may have any suitable implementation, such as access points (APs), switches, routers, gateways, and so forth.

The network device 105 comprises a transmitter 120 comprising hardware for transmitting data to the network device 110 on the communicative link 115. The transmitter 120 may wirelessly transmit the data using electrical signals. The network device 105 may further include a receiver and associated hardware for receiving data from the network device 110 on the communicative link 115.

The transmitter 120 comprises one or more computer processors 122 (also referred to herein as "processors 122") and a memory 125. The one or more computer processors 122 may be implemented in any suitable form, such as a general purpose microprocessor, a controller, an application-specific integrated circuit (ASIC), and so forth. The memory 125 may include a variety of computer-readable media selected for their size, relative performance, or other capabilities: volatile and/or non-volatile media, removable and/or non-removable media, etc.

The memory 125 may include one or more modules for performing various functions described herein. In one embodiment, each module includes program code that is executable by the one or more computer processors 122. However, other embodiments of the system 100 may include module(s) that are partially or fully implemented in other hardware (i.e., circuitry) or firmware. As shown, the memory 125 comprises an error prediction module 126, a bitmapping module 128, and a modulation module 130.

The error prediction module 126 receives one or more transmission characteristics 140 and predicts error values for a sequence of bit positions used for modulating a packet. Within a wireless channel, different subcarriers may exhibit different signal-to-noise ratios (SNRs) and/or bit error rates (BERs) for different subcarriers, e.g., due to frequency selective fading.

Further, different bit positions in the packet may exhibit different BERs. Conventional techniques to address the diversity of the subcarriers may attempt to equalize the BER of the bit positions in a packet. For example, a transmitter may apply error control coding to produce a redundancy-containing stream of coded bits, and may interleave and pseudo-randomly spread the coded bits over different subcarriers. However, certain bit positions of a modulation constellation continue to be more reliable than other bit positions, e.g., due to having a larger Hamming distance between their '0' constellation points and '1' constellation points.

The one or more transmission characteristics 140 represents characteristic(s) of the communicative link 115 and/or characteristic(s) describing a configuration of the transmitter 120. The one or more transmission characteristics 140 affect the reliability of the bit positions, e.g., as reflected in the predicted error values. In some embodiments, the one or more transmission characteristics 140 comprise one or both of channel state information (CSI) 136 and a transmission vector (TXVECTOR) format 138. In some embodiments, the transmitter 120 obtains the CSI 136 through implicit and/or explicit channel sounding (e.g., acquiring one or more measurements 142 related to the communicative link 115). The CSI 136 generally characterizes how wireless signals propagate from the transmitter 120 to a receiver 145 at certain carrier frequencies. In some embodiments, the CSI 136 is represented as a three-dimensional matrix of complex values. In some embodiments, the CSI 136 comprises amplitude and phase components.

The TXVECTOR format 138 comprises a list of one or more parameters that the media access control (MAC) sublayer provides to the PHY layer to transmit a frame (also referred to as a MAC Protocol Data Unit (MPDU)). One or more MPDUs may be aggregated into an aggregated MPDU (A-MPDU), which is delimited and padded to form a physical layer service data unit (PSDU). The PSDU is coded and modulated to create the transmitted packet. In some embodiments, the TXVECTOR format 138 comprises an APEP length representing a length of the A-MPDU. In some embodiments, the TXVECTOR format 138 comprises a modulation and coding scheme (MCS) parameter. For example, the MCS parameter may include a modulation order and a code rate for forward error correction (FEC).

In some embodiments, predicting the error values for the sequence of bit positions comprises calculating, using the CSI 136, a respective bit error rate for each bit position of the sequence. In some embodiments, predicting the error values comprises calculating an error event probability (EVP) as described in "Recitation: Rehearsing Wireless Packet Reception in Software", MobiCom '15: Proceedings of the 21st Annual International Conference on Mobile Computing and Networking, September 2015, pp. 291-303. This paper is herein incorporated by reference in its entirety.

Using the error values predicted by the error prediction module 126, the bitmapping module 128 generates a bitmap 132 that maps one or more payload bits 156 and one or more padding bits 158 of a packet 155 to respective bit positions of the sequence. Within the bitmap 132, the one or more padding bits 158 are preferentially mapped to respective bit positions having relatively greater error values (e.g., bit positions having lower reliability). In some embodiments, preferentially mapping the one or more padding bits 158 comprises identifying a first set of the bit positions having the greatest error values, and mapping the one or more padding bits 158 to the first set.

Additionally or alternately to the preferential mapping of the one or more padding bits 158, the bitmap 132 may preferentially map the one or more payload bits 156 to respective bit positions having relatively lessor error values (e.g., bit positions having higher reliability). In some embodiments, preferentially mapping the one or more payload bits 156 comprises identifying a second set of the bit positions having the least error values, and mapping the one or more payload bits 156 to the second set.

Figure 7:
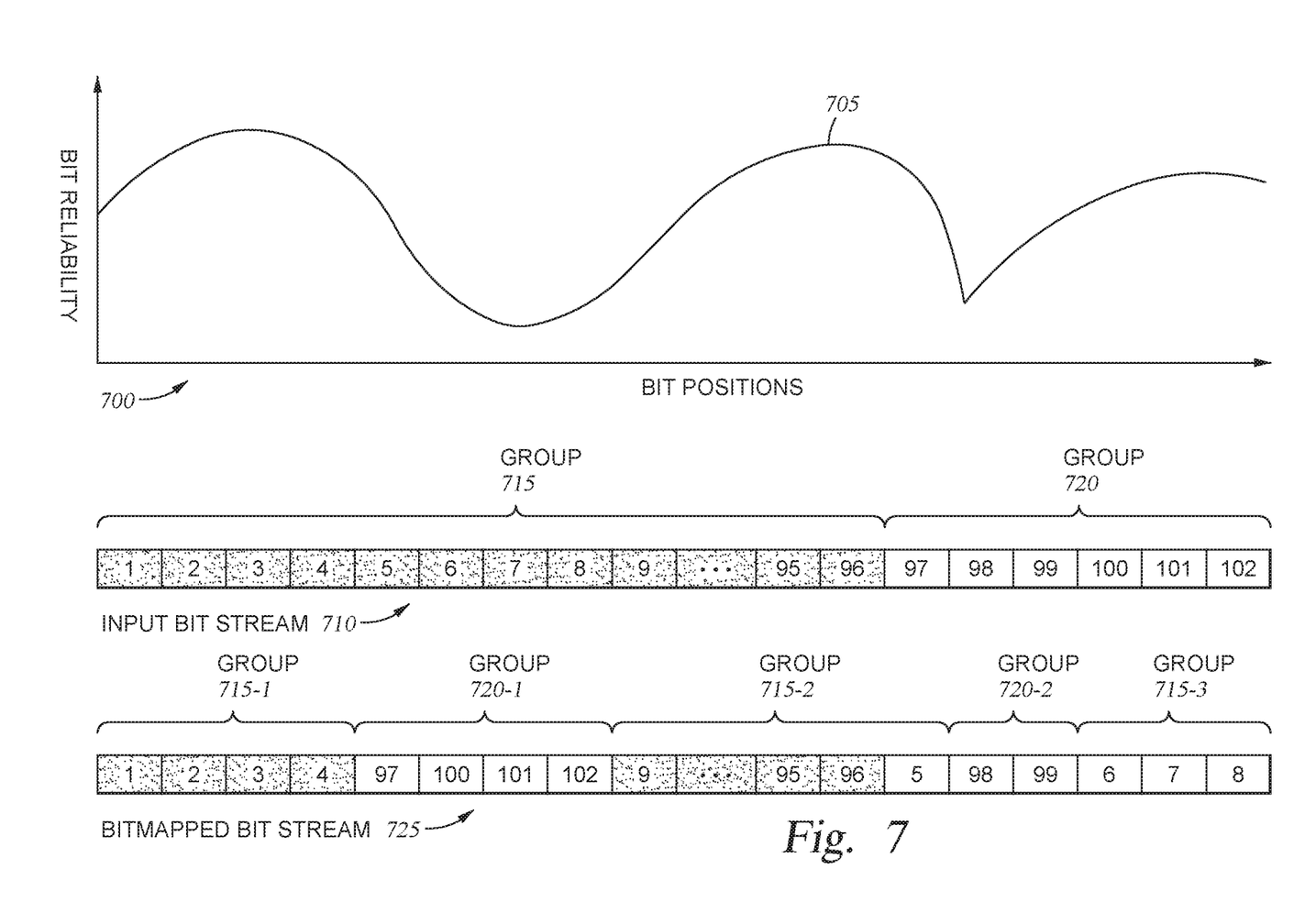
FIG. 7 is a diagram illustrating a bitmapped bit stream based on bit position reliability, according to one or more embodiments.

Thus, the functionality of the bitmapping module 128 may be alternately described as an interleaver that permutes bit positions of the sequence according to their reliability. In this way, the transmission throughput and reliability of the system 100 may be improved for packets 155 having the one or more padding bits 158. For example, FIG. 7 is a diagram 700 illustrating a bitmapped bit stream based on bit position reliability, which is represented as plot 705. The plot 705 indicates that certain bit positions have higher bit reliability (e.g., corresponding relatively lesser error values). The bitmapping module 128 may receive an input bit stream 710, comprising ninety-six (96) payload bits arranged sequentially in a first group 715, and six (6) padding bits arranged sequentially in a second group 720. However, some of the payload bits in the input bit stream 710 correspond to bit positions with lower reliability, and some of the padding bits correspond to bit positions with greater reliability.

In some embodiments, the bitmapping module 128 maps padding bits to bit positions with lower reliability, and maps payload bits to bit positions with greater reliability. As shown, the bitmapping module 128 generates a bitmapped bit stream 725 as a first group 715-1 of four (4) payload bits, a first group 720-1 of four (4) padding bits, a second group 715-2 of eighty-nine (89) payload bits, a second group 720-2 of two (2) padding bits, and a third group 715-3 of three (3) payload bits. In some embodiments, the bits of the first group 720-1, the second group 715-2, the second group 720-2, and/or the third group 715-3 may be reordered in the bitmapped bit stream 725.

Returning to FIG. 1, the memory 125 further comprises a bit indication table 134 for the packets 155, used to distinguish the different classes of bits. For example, the transmitter 120 may define and maintain the bit indication table 134 in the memory 125, in which a first value (e.g., a "1" value) denotes each of the one or more payload bits 156, and in which a second value (e.g., a "0" value) denotes each of the one or more padding bits 158.

In some embodiments, the bit indication table 134 is processed similarly to the processing performed on the packets 155 (e.g., punctured, shortened, repeated, interleaved, grouped) in the same way as the normal bit operations. Along with the packets 155, the bit indication table 134 may be communicated to the receiver 145 via the communicative link 115. Generally, the bitmap 132 need not be transmitted to the receiver 145, as the information in the bitmap 132 may be constructed by the receiver 145 using the TXVECTOR format 138 and the CSI 136.

The memory 125 further comprises the modulation module 130, which modulates the sequence according to the MCS parameter: a modulation order such as binary phase shift keying (BPSK), quadrature phase shift keying (QPSK), 16-bit quadrature amplitude modulation (16-QAM), 64-bit QAM (64-QAM), 256-bit QAM (256-QAM), and so forth. The MCS parameter may further specify a FEC code rate, such as 1/2, 2/3, 3/4, 7/8, and so forth.

The network device 110 comprises the receiver 145 comprising hardware for receiving data from the network device 105 on the communicative link 115. The network device 110 may further include a transmitter and associated hardware for transmitting data to the network device 105 on the communicative link 115. In some embodiments, the network devices 105, 110 may be similarly configured with transceivers that perform the functionality of the transmitter 120 and the receiver 145.

The receiver 145 comprises one or more computer processors 146 (also referred to herein as "processors 146") that may have a similar structure and/or function as the one or more computer processors 122 and a memory 148 that may have a similar structure and/or function as the memory 125. The memory 148 comprises a demodulation module 150 and a debitmapping module 152.

The demodulation module 150 demodulates the sequence according to the MCS parameter (e.g., the specified modulation order and FEC code rate). Using the bitmap 132, the debitmapping module 152 restores the one or more payload bits 156 and the one or more padding bits 158 to their original sequencing.

At the receiver 145, the cyclic redundancy check (CRC) is not performed at the PHY layer for the decoded bits (PSDU) of the data field. Instead, the one or more padding bits 158 are removed after the decoded bits are handed back to the MAC layer, and the CRC is performed on the one or more payload bits 156. Receipt of the packet will be considered successful at the MAC layer so long as no error is detected in the one or more payload bits 156. Notably, any errors occurring in the one or more padding bits 158 will not impact the result of the CRC. Thus, the preferential mapping performed by the bitmapping module 128 to map the one or more payload bits 156 to more reliable bit positions improves the probability that the one or more payload bits 156 will be successfully received by the receiver 145.

Figure 2:
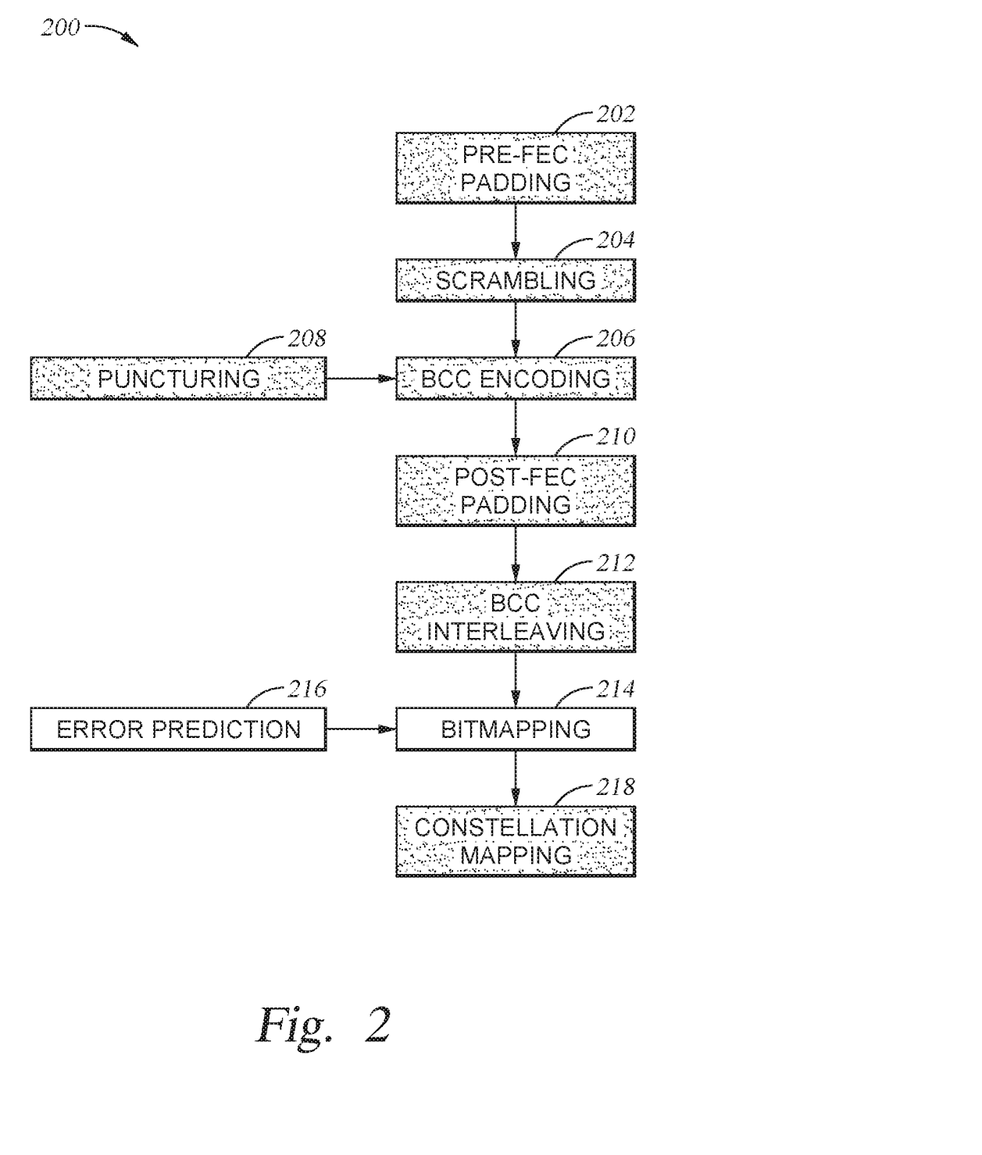
FIG. 2 is a block diagram illustrating a portion of an exemplary transmitter using convolutional coding, according to one or more embodiments.

FIG. 2 is a block diagram 200 illustrating a portion of an exemplary transmitter using convolutional coding, according to one or more embodiments. The features illustrated in the block diagram 200 may be used in conjunction with other embodiments, such as one implementation of the transmitter 120 of FIG. 1.

In the block diagram 200, the MAC layer presents a frame for transmission to a pre-FEC padding block 202, which pads the frame so that its length matches a number of bits required to end on a PHY layer symbol boundary. The pre-FEC padding block 202 outputs to a scrambling block 204 that scrambles the bits to reduce a probability of encountering long strings of identical bits in the output, as convolutional codes tend to perform better on data without such long strings.

The scrambling block 204 outputs to a binary convolution coding (BCC) encoding block 206, the operation of which is understood by a person of skill in the art. In some embodiments, the BCC encoding block 206 is a single-rate encoder, and different code rates may be achieved via a puncturing block 208.

The BCC encoding block 206 outputs to a post-FEC padding block 210 which pads the bits so that its length matches a number of bits required to end on a PHY layer symbol boundary. A BCC interleaving block 212 takes sequential bits from the different carriers and separates them within the bitstream to isolate errors, which makes the errors easier to correct as convolution codes tend to perform better when errors are isolated.

A bitmapping block 214 (representing the functionality of the bitmapping module 128 of FIG. 1) receives the interleaved bitstream from the BCC interleaving block 212. Using predicted error values from an error prediction block 216 (representing the functionality of the error prediction module 126 of FIG. 1), the bitmapping block 214 maps payload bits and/or padding bits to respective bit positions in the sequence. A constellation mapping block 218 maps the bits of the sequence onto constellation points using the selected modulation scheme.

Figure 3:
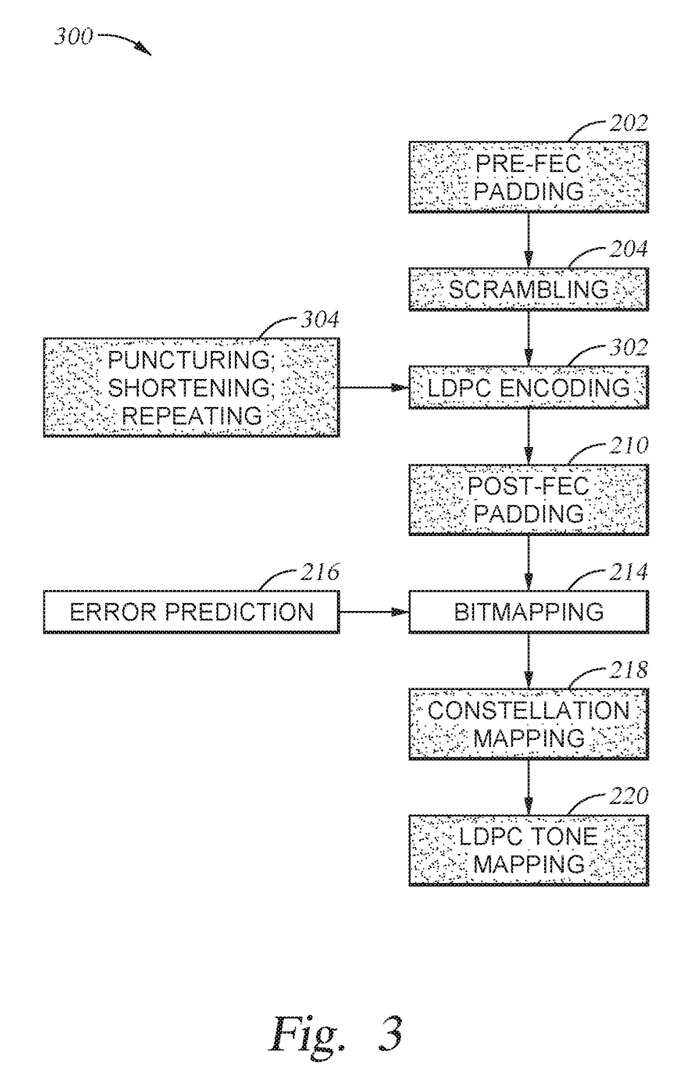
FIG. 3 is a block diagram illustrating a portion of an exemplary transmitter using low-density parity-check coding, according to one or more embodiments.

FIG. 3 is a block diagram 300 illustrating a portion of an exemplary transmitter using low-density parity-check (LDPC) coding, according to one or more embodiments. The features illustrated in the block diagram 300 may be used in conjunction with other embodiments, such as one implementation of the transmitter 120 of FIG. 1.

In the block diagram 300, the MAC layer presents a frame for transmission to the pre-FEC padding block 202, which outputs to the scrambling block 204. The scrambling block 204 outputs to a LDPC encoding block 302, the operation of which is understood by a person of skill in the art. In some embodiment, the transmitter provides rate matching via a puncturing, shortening, repeating block 304 to select a number of bits from the encoded output of the LDPC encoding block 302. The LDPC encoding block 302 outputs to the post-FEC padding block 210 which pads the bits so that its length matches a number of bits required to end on a PHY layer symbol boundary.

The bitmapping block 214 receives the interleaved bitstream from the post-FEC padding block 210, and maps payload bits and/or padding bits to respective bit positions in the sequence using predicted error values from the error prediction block 216. The constellation mapping block 218 maps the bits of the sequence onto constellation points using the selected modulation scheme.

A LDPC tone mapping block 220 receives the bitmapped output of the bitmapping block 214. The LDPC tone mapping block 220 ensures the different constellation points are mapped to OFDM subcarriers that are separated by a sufficient distance to mitigate a risk of interference with successive bits.

The implementations of the transmitter that are depicted in FIG. 2 and FIG. 3 may include additional functionality. For example, the transmitter may further include blocks for segment deparsing, space-time block coding, pilot insertion, cyclic shift diversity, spatial mapping, inverse Fourier transform, guard interval insertion, windowing, preamble construction, RF signal conversion, power amplification, and so forth.

Figure 4:
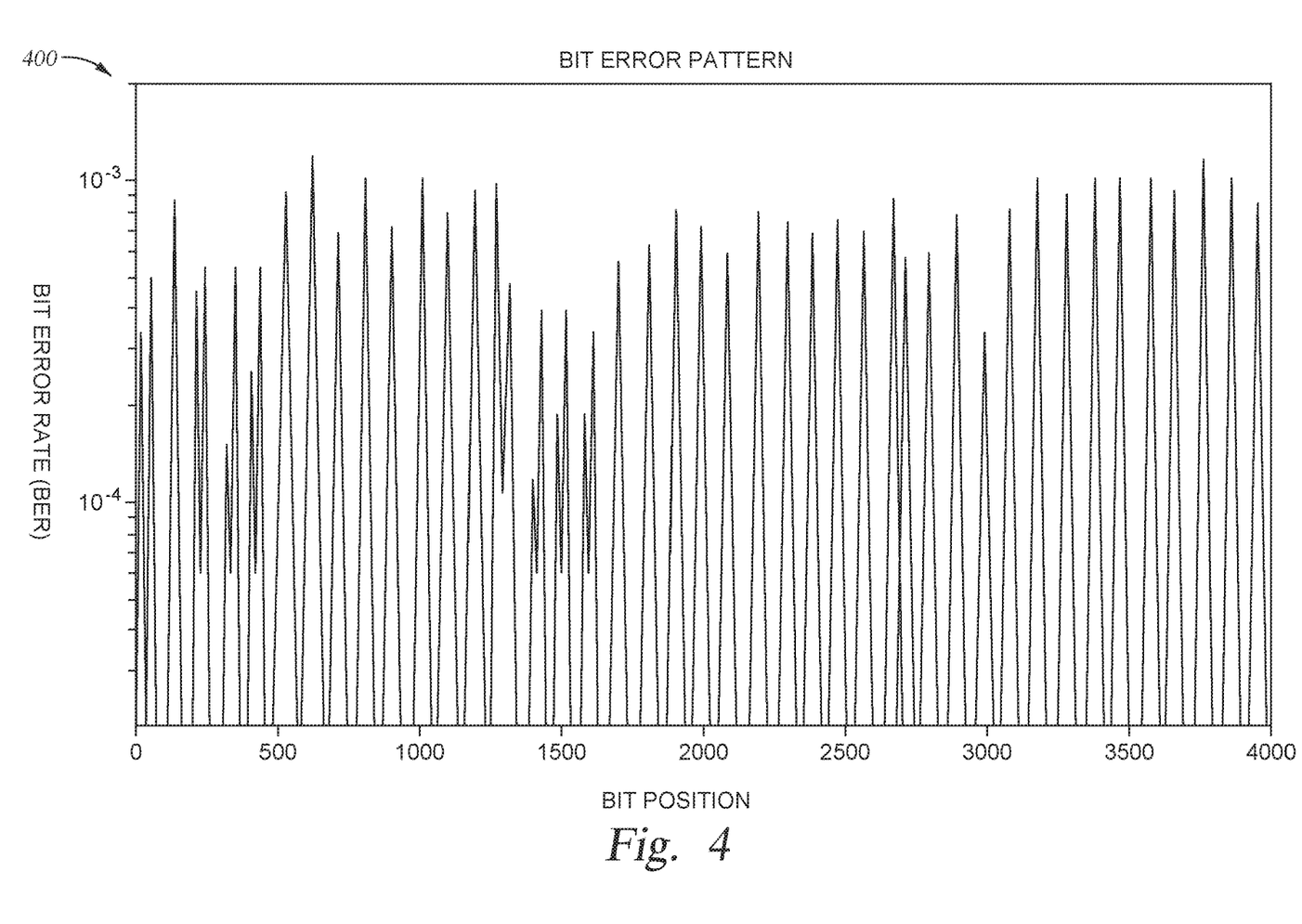
FIG. 4 is a graph illustrating exemplary bit error rates for a plurality of bit positions, according to one or more embodiments.

FIG. 4 is a graph 400 illustrating exemplary bit error rates (BERs) for a plurality of bit positions, according to one or more embodiments. As shown in the graph 400, the range of BERs for a particular bit position varies between a minimum BER of about $1\times10^{-5}$ and a maximum BER of about $1\times10^{-3}$. Further, the graph 400 illustrates a predictable periodicity of the peaks of the BER, which correspond to bit positions having lower reliability. According to embodiments described herein, the bitmapping module 128 of FIG. 1 generates a bitmap that preferentially maps padding bits to bit positions having relatively greater BER values, and/or payload bits to bit positions having relatively lesser BER values.

Figure 5:
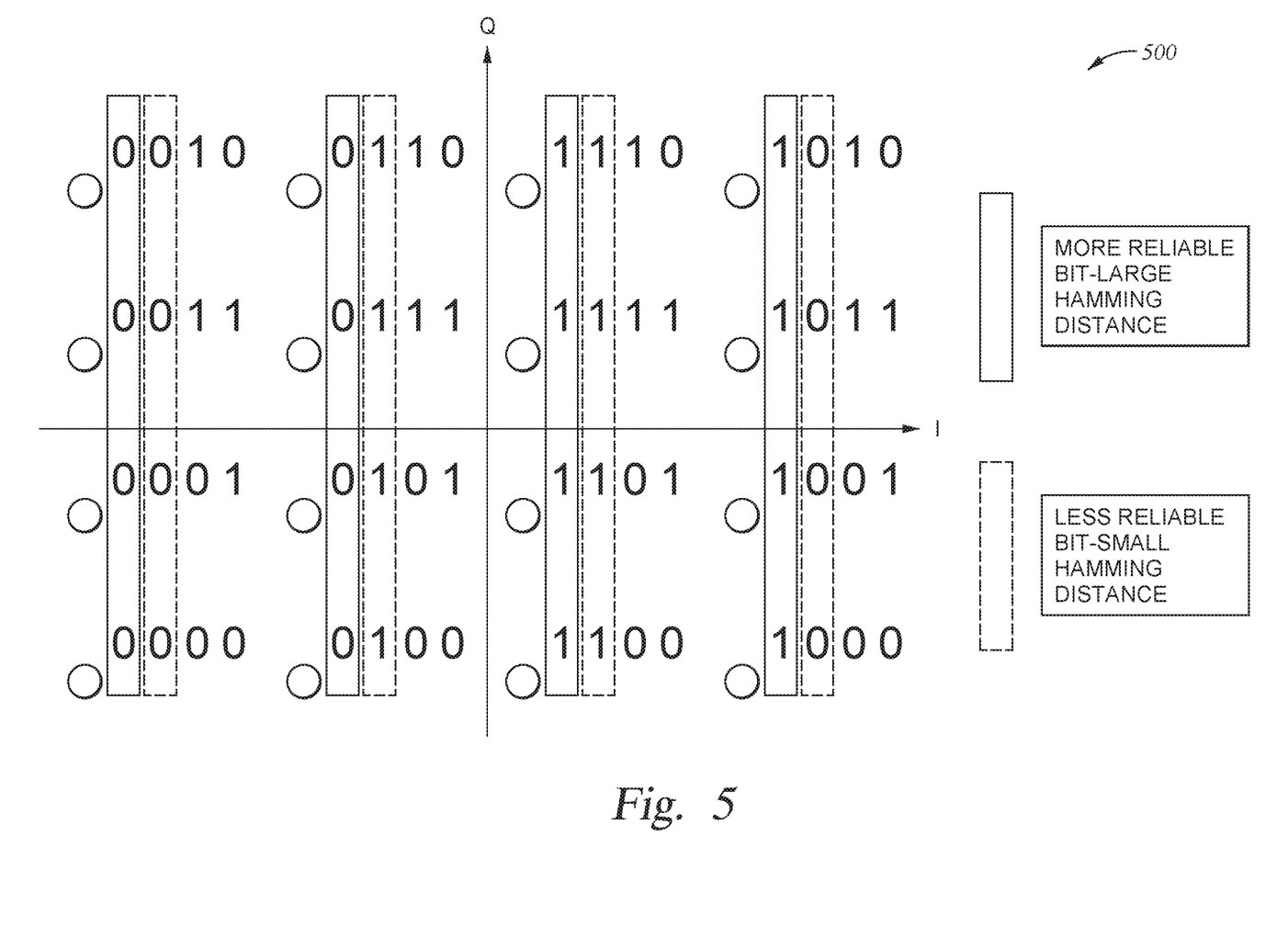
FIG. 5 is a graph illustrating an exemplary modulation constellation with a plurality of bit positions, according to one or more embodiments.

FIG. 5 is a graph 500 illustrating an exemplary modulation constellation with a plurality of bit positions, according to one or more embodiments. In the graph 500, the modulation constellation corresponds to 16-QAM. The first (leftmost) bit position is considered a more reliable bit with a greater Hamming distance than the second bit position, as would be understood by a person of ordinary skill in the art. Similarly, the third bit position is also considered a more reliable bit than the fourth bit position.

Figure 6:
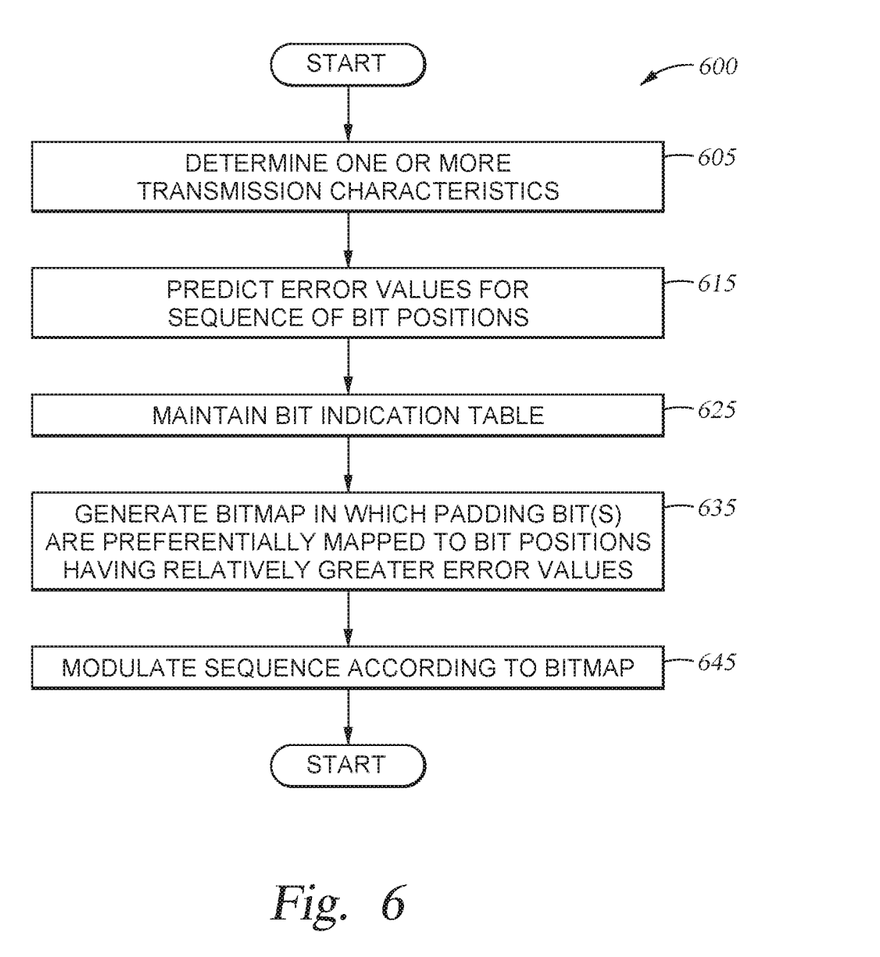
FIG. 6 illustrates an exemplary method of mapping bit positions using predicted error values, according to one or more embodiments.

FIG. 6 illustrates an exemplary method 600 of mapping bit positions using predicted error values, according to one embodiments. The method 600 may be used in conjunction with other embodiments discussed herein, e.g., performed by the transmitter 120 of FIG. 1.

The method 600 begins at block 605, where one or more transmission characteristics are determined. In some embodiments, the one or more transmission characteristics comprise one or both of CSI and a TXVECTOR format.

At block 615, error values are predicted for a sequence of bit positions. In some embodiments, predicting the error values for the sequence of bit positions comprises calculating a respective bit error rate for each bit position of the sequence using the CSI. In some embodiments, predicting the error values comprises calculating an error event probability (EVP).

At block 625, a bit indication table is maintained. The bit indication table distinguishes the different classes of bits of the original bit stream (e.g., payload or padding bits).

At block 635, a bitmap is generated in which padding bits are preferentially mapped to bit positions having relatively greater error values. In some embodiments, the bitmap preferentially maps payload bits to bit positions having relatively lesser error values.

At block 645, the sequence is modulated according to the bitmap. The method 600 ends following completion of block 645.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   obtaining wireless fidelity channel state information (CSI) through channel sounding;
   predicting, based at least in part on the CSI and a modulation coding scheme parameter of a transmission vector format, error values for a sequence of bit positions used for modulating data within a packet;
   generating a bitmap that maps one or more payload bits and one or more padding bits of the packet to respective bit positions of the sequence, wherein the one or more padding bits are preferentially mapped to respective bit positions having relatively greater error values; and
   modulating the sequence according to the bitmap.

2. The method of claim 1, wherein predicting the error values for a sequence of bit positions comprises calculating, using the CSI, a respective bit error rate (BER) for each bit position of the sequence.

3. The method of claim 1, further comprising maintaining a bit indication table indicating initial bit positions of the one or more payload bits and the one or more padding bits, wherein generating the bitmap is based on the bit indication table.

4. The method of claim 1, wherein preferentially mapping the one or more padding bits comprises:
   identifying a first set of the bit positions having greatest error values; and
   mapping the one or more padding bits to the first set.

5. The method of claim 4, wherein the bitmap preferentially maps the one or more payload bits to respective bit positions having relatively lesser error values, wherein preferentially mapping the one or more payload bits comprises:
   identifying a second set of the bit positions having least error values; and
   mapping the one or more payload bits to the second set.

6. A network device comprising:
   one or more computer processors configured to:
      obtain wireless fidelity channel state information (CSI) through channel sounding;
      predict, based at least in part on the CSI and a modulation coding scheme parameter of a transmission vector format, error values for a sequence of bit positions used for modulating data within a packet;
      generate a bitmap that maps one or more payload bits and one or more padding bits of the packet to respective bit positions of the sequence, wherein the one or more padding bits are preferentially mapped to respective bit positions having relatively greater error values; and
      modulate the sequence according to the bitmap.

7. The network device of claim 6, wherein predicting the error values for a sequence of bit positions comprises calculating, using the CSI, a respective bit error rate (BER) for each bit position of the sequence.

8. The network device of claim 6, wherein the one or more computer processors are further configured to maintain a bit indication table indicating initial bit positions of the one or more payload bits and the one or more padding bits, wherein generating the bitmap is based on the bit indication table.

9. The network device of claim 6, wherein preferentially mapping the one or more padding bits comprises:
   identifying a first set of the bit positions having greatest error values; and
   mapping the one or more padding bits to the first set.

10. The network device of claim 9, wherein the bitmap preferentially maps the one or more payload bits to respective bit positions having relatively lesser error values, wherein preferentially mapping the one or more payload bits comprises:
    identifying a second set of the bit positions having least error values; and
    mapping the one or more payload bits to the second set.

11. A computer program product comprising:
    a non-transitory computer-readable storage medium having computer-readable program code embodied therewith, the computer-readable program code executable by one or more computer processors to perform an operation comprising:
       obtaining wireless fidelity channel state information (CSI) through channel sounding;
       predicting, based at least in part on the CSI and a modulation coding scheme parameter of a transmission vector format, error values for a sequence of bit positions used for modulating data within a packet;
       generating a bitmap that maps one or more payload bits and one or more padding bits of the packet to respective bit positions of the sequence, wherein the one or more padding bits are preferentially mapped to respective bit positions having relatively greater error values; and modulating the sequence according to the bitmap.

12. The computer program product of claim 11, wherein predicting the error values for a sequence of bit positions comprises calculating, using the CSI, a respective bit error rate (BER) for each bit position of the sequence.

13. The computer program product of claim 11, the operation further comprising:

maintaining a bit indication table indicating initial bit positions of the one or more payload bits and the one or more padding bits, wherein generating the bitmap is based on the bit indication table.

14. The computer program product of claim 13, wherein preferentially mapping the one or more padding bits comprises:

identifying a first set of the bit positions having the greatest error values; and mapping the one or more padding bits to the first set.

* * * * *